Figure 1:
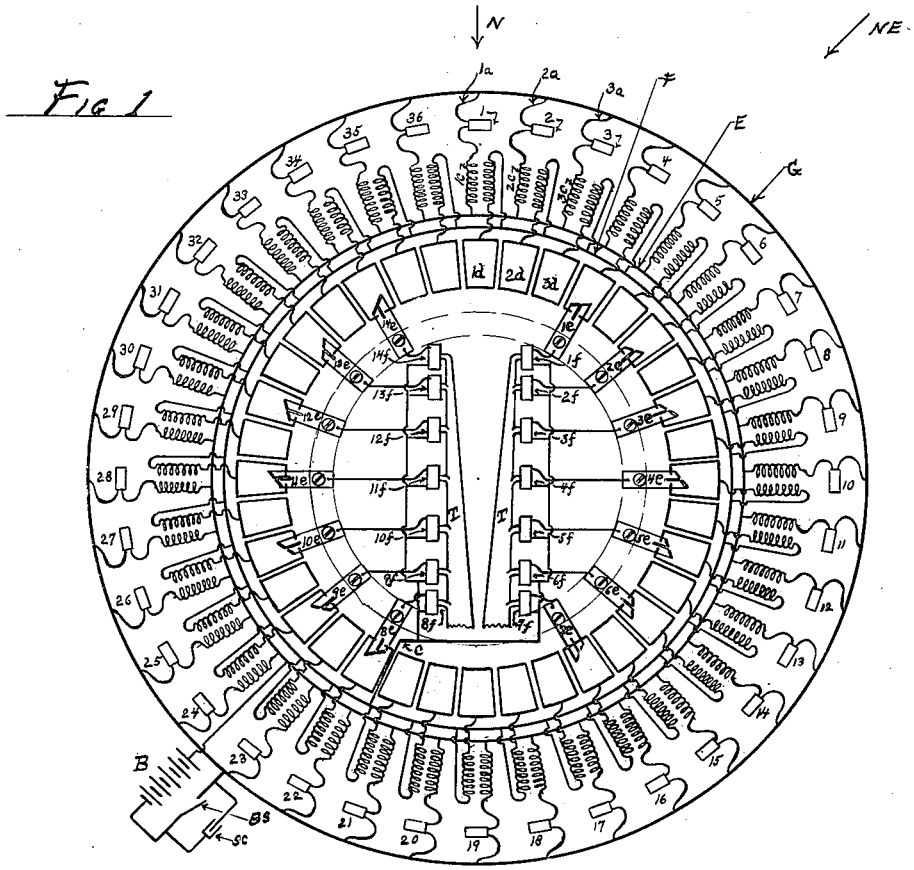

March 31, 1925.

H. C. HAYES

DETERMINATION OF WAVE ENERGY DIRECTION

Filed June 25, 1919  3 Sheets-Sheet 1

INVENTOR.
Harvey C. Hayes

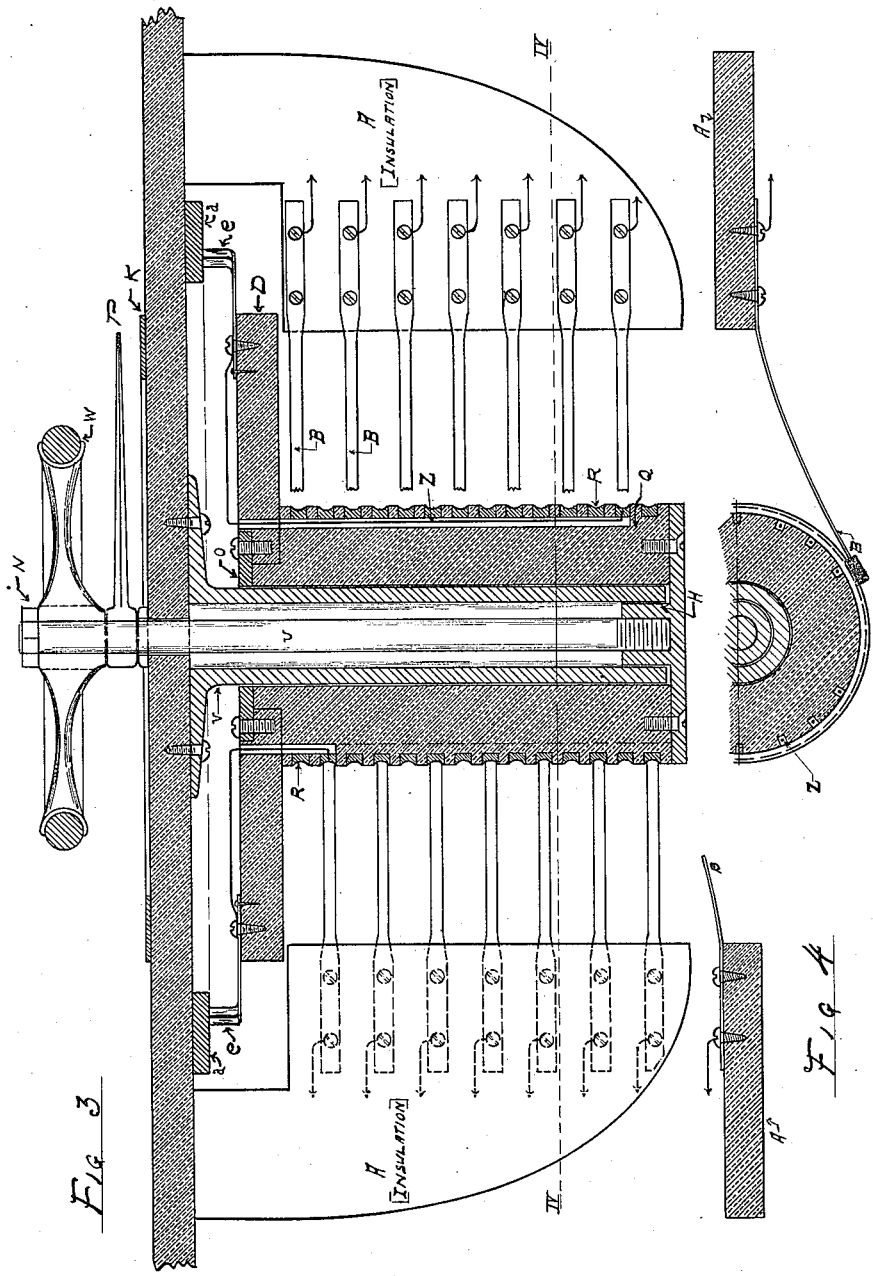

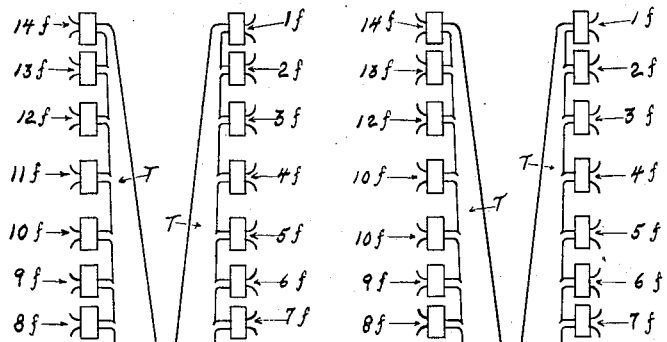
Fig 5
Fig 6
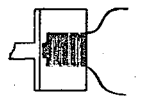
Fig 7

Patented Mar. 31, 1925.

1,532,108

UNITED STATES PATENT OFFICE.

HARVEY C. HAYES, OF NEW LONDON, CONNECTICUT, ASSIGNOR TO SUBMARINE SIGNAL COMPANY, OF PORTLAND, MAINE, A CORPORATION OF MAINE.

DETERMINATION OF WAVE-ENERGY DIRECTION.

Application filed June 25, 1919. Serial No. 306,686½.

*To all whom it may concern:*

Be it known that I, HARVEY C. HAYES, a citizen of the United States, residing at New London, in the county of New London and State of Connecticut, have invented new and useful Improvements in the Determination of Wave-Energy Direction, of which the following is a specification.

The present invention relates to the determination of wave energy direction and more particularly to the determination of the direction of wave energy by means of a plurality of wave energy receptors disposed in a circle, whereby the determination of the direction of wave energy passing over the circle in any direction may be determined. The determination of the wave energy direction is preferably effected by a detecting device connected with the receptors by connections so arranged as to bring the received wave energy into phase at the detecting device. The circle of receptors may be turned with relation to the direction of incident wave energy to bring the energy in phase at the detecting device, but preferably the circle of detectors is fixed and the wave energy is brought into phase at the detecting device by shifting the connections from the detecting device along the circle of receptors. The present invention is applicable to the determination of the direction of various kinds of wave energy, for example, radio energy. The invention has been embodied in apparatus for determining the direction of submarine sounds and will be explained with particular reference to such embodiment, although it is understood that the invention is not limited to the determination of the direction of sound energy.

As embodied in a submarine sound detecting device, the apparatus comprises a plurality of receptors of sound energy disposed at equal angular distances around the circumference of a circle. These receptors are usually of the microphonic type. The impulses from the several receptors are brought to the listening station which may be at a distance from the circle of receptors, through wires which may or may not be bound together in a cable. At the listening station the electrical impulses are transformed again into sound transmitted to the listener's ears through suitable listening apparatus. The connections from the microphones are brought, preferably through transformers, to output terminals. The telephonic receivers or translating devices which transform the electric impulses into sound waves are connected with input terminals which are connected at will to the different output terminals. This is preferably accomplished by disposing the output terminals and input terminals in a circular arrangement of contact blocks and brushes so that by moving the brushes over the contact blocks the angular relation of the input terminals to the output terminals and consequently to the receptors, may be varied at will by the operator. Between the input terminals and the listening device at the ears of the observer are interposed compensated connections to impose relatively different time lags on the energy waves coming from the several input terminals to the ears. This may be accomplished by connecting the several receivers to the ears by using air paths of properly proportioned length to bring the air waves into phase at the ear, or the electrical currents from the input terminals may be led over loaded electric lines to introduce different time lags and the currents brought together at telephonic ear pieces, the loaded lines being so proportioned as to bring the currents into phase.

Figure 2:
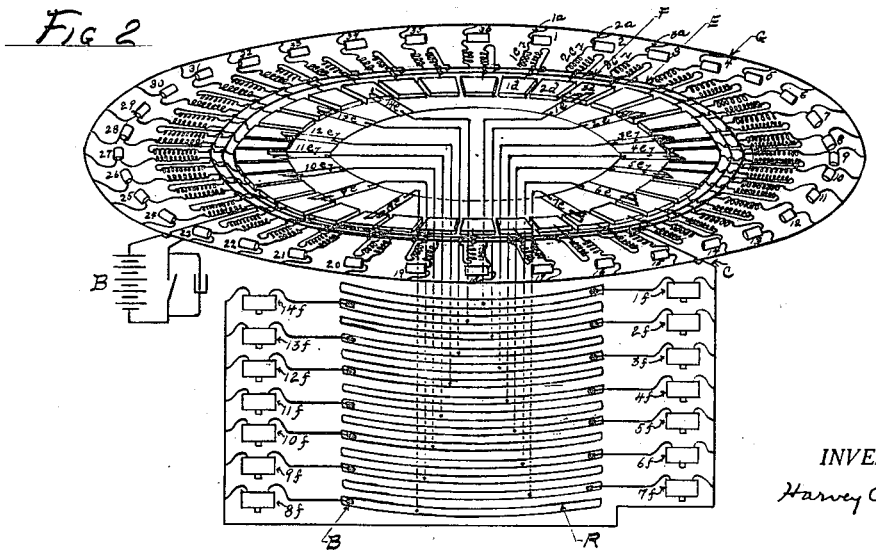

In the drawings which illustrate the preferred embodiment of the invention as applied to submarine sound detection, Fig. 1, is a schematic view showing the circle of receptors and the connections to the detecting device. Fig. 2, is a schematic view showing the receptors and connections, and particularly the slip ring connections from the commutating switch to the several telephonic receivers. Fig. 3, is an elevation, partial in section, of the commutating switch and slip rings. Fig. 4 is a cross section along the line IV—IV of Fig. 3. Figs. 5 and 6, are diagrammatic views showing air path connection from the several receivers to the stethoscopes. Fig. 5 showing a stethoscope arrangement for binaural listening and Fig. 6, showing a stethoscope arrangement for listening to a maximum, but without binaural. Fig. 7 is a detailed view showing a section through one of the receivers for translating the electrical impulses into sound waves.

Referring to the illustrated embodiment of the invention reference numerals 1–36 inclusive, indicate thirty-six microphonic receptors of submarine sound spaced equally around the circumference of a circle. In practice this circle has been made eight feet in diameter and thirty-six microphones have been used, but the dimensions and number of microphones may be varied. The microphones may be of any suitable submarine type. The type of microphone with its rubber housing for submarine work disclosed in my U. S. Letters Patent No. 1,470,733, dated October 16, 1923, is well adapted for this purpose. In practice the microphones are usually mounted on a rigid circular frame to hold them in proper spaced relation.

The circle of microphones may be supported in any one of a number of positions as will be understood by those skilled in the art.

One lead from each microphone indicated by reference numerals $1^a$, $2^a$, etc., joins a common ground wire G. This wire connects with one terminal of a battery B. The other lead from each of the microphones passes through the primary of a transformer, the series of transformers being indicated by reference numerals $1^c$, $2^c$, etc., there being a transformer for each microphone. The transformer primaries are connected together through the conductor E to the other terminal of the battery. The battery switch BS is shunted by the condenser SC which absorbs the electromagnetic energy of the circuit when the switch is opened, thereby protecting the microphones against packing. The wires from the several microphones to the battery and transformers may be lead through a cable to the listening station which in general is located at a distance from the receptors. One terminal of the secondary of each transformer connects with the common lead F, and the other terminal is connected to one of the segments $1^d$, $2^d$, $3^d$, etc., which are arranged as a series of stationary blocks, indicated at $d$ in the structural view shown in Fig. 3. A series of brushes, $e$ mounted on a rotatable plate D, are arranged to move over the series of stationary blocks $d$. As shown in Fig. 1, there are fourteen of these brushes indicated by reference characters $1^e$, $2^e$, to $14^e$, inclusive. These brushes are connected with translating devices, numbered $1^f$, $2^f$ etc. to $14^f$. These translating devices are receivers of the telephonic type which transform the electric current received by means of the brushes into sound waves in a well known manner. A diagrammatic cross section of one of the marine receivers is shown in Fig. 7. The secondaries of the various transformers whose blocks $d$ are in contact with the various brushes, have their circuits closed by passing through the receivers $1^f$, $2^f$, etc., respectively and thence through the common lead $c$ to the conductor F. Each transformer secondary whose switch segment is not in contact with a brush is open.

The receivers $1^f$, $2^f$, etc., are divided into two groups of seven receivers each. Each group is connected with an air column T. The air columns T are connected with a stethoscope S. The air columns T may be connected independently to the respective ear pieces of the stethoscope as shown in Fig. 5 for binaural listening, or the air columns may be joined in a Y as shown in Fig. 6 which branches to the two ear pieces of the stethoscope, in which case the direction of sound is determined by maximum sound but without binaural.

Referring particularly to Fig. 1, suppose that the direction of the sound is that indicated by the arrow N, the wave front being perpendicular to this direction. This sound can only reach the listener's ears through the fourteen microphones, whose secondary circuits are closed by the fourteen brushes $1^e$, $2^e$, etc. These particular microphones are those numbered 4, 6, 8, 10, 12, 14, 16 on one side of the circle, and 34, 32, 30, 28, 26, 24 and 22 on the other side of the circle. It is evident, therefore, that for sound proceeding in this direction the pair of microphones numbered 4 and 34 are actuated at the same instant since a straight line joining these two microphones is parallel to the wave front. Also microphones numbered 6 and 32 respectively will receive sound impulses in phase, but somewhat later than the pairs numbered 4 and 34, the actual time lag being the time required for the sound to travel the perpendicular distance between the line joining microphones 4 and 34 and the line joining microphones 6 and 32. Similarly, the pairs of microphones 8 and 30, 10 and 29, 12 and 26, 14 and 24, 16 and 22 each receive the sound impulses in phase but the response from each pair is delayed somewhat with respect to the preceding pair. The actual time lag between the impulses received by any two pairs is obviously the time required for the sound to travel the perpendicular distance between the straight lines joining the microphones of each pair. The time lag between any two pairs of microphones will be proportional to the difference in the cosines of the angles subtended between the direction N through the center of the circle and the radii joining such microphones with the center.

The responses from the various pairs of receivers $1^f$ and $14^F$, $2^F$ and $13^F$, $3^F$ and $12^F$, etc., will be timed in accordance with the corresponding pairs of microphones, provided the time constants of the various electric circuits are the same. It is important, as will be shown, that the responses from the various receivers shall reach the listener's ear in phase. In the arrangement illustrated, this is accomplished by making the length of the air path between the receiver and the ear different for different pairs of receivers. Consider the left hand group of receivers $1^f$, $2^f$ to $7^f$ inclusive. If the length of air path which the sound from receiver $1^f$ travels over and above, that which the sound from receiver $2^F$ has to travel to reach the listener's ears is 23/100 of the distance that the sound travels to reach the microphone 6, over and above that traveled to reach the microphone 4, then the responses from the receivers $1^f$ and $2^f$ will reach the ear in phase, since the ratio of velocity of sound in the air to the velocity of sound in water is 23 to 100. Also if the difference in length of air path between receiver $1^f$ and each of the other receivers of this group be similarly determined, then the sound from all seven receivers will reach the listener's ear in phase.

From conditions of symmetry it is evident that the same combination of air path distances will bring the sounds from the other or left hand group of receivers into phase. Sounds from a direction other than that indicated by the arrow N, for example the direction indicated by arrow N E, will reach the listener's ears out of phase. The sound from this direction, N E, can be brought to the listener's ears in phase by rotating the circle of microphonic receivers in a clockwise direction through the angle subtended between two directions N, and N E. The sound is, however, preferably brought into phase by leaving the circle of microphonic receptors fixed, and rotating the plate D, with the brushes $e$ in a clockwise direction through the same angle. This latter method which is shown in the illustrations, avoids rotating heavy parts and permits of easy and rapid manipulation. It also permits the compensator switch to be placed at any distance from the microphonic receptors.

It is to be understood that the showing in Figures 1 and 2 is schematic only and that the dimensions for the various parts are not proportioned as actually constructed. For example, the circle of microphonic receptors is in practice about eight feet in diameter, while the switch may be only about a foot to a foot and a half in diameter.

In practice, the receivers are not attached to the rotating elements of the compensator switch as shown in Fig. 1, but make brush contact on fourteen separate slip-rings which in turn are electrically connected to the brushes $1^e$, $2^e$, etc., as shown diagrammatically in Fig. 2. This arrangement avoids the possibility of twisting and breaking the electric leads.

The structure of the switch is shown in Figures 3 and 4. The switch consists of an insulating plate D to which is secured an insulating cylinder Q which carries fourteen slip-rings R. Fixed insulating blocks A carry brushes B which make contact with the slip-rings. Two of the brushes $e$ are shown, which make a contact with the series of transformer terminal blocks $d$.

For convenience the series of blocks $d$ may be regarded as the output terminals of the microphone lines and the brushes $e$ as the input terminals of the leads to the translating device which are the telephonic receivers $1^f$, $2^f$, etc. The plate D and the cylinder Q can be rotated about the fixed tube V being held centered by an external bearing O, and an internal bearing H. This rotation is accomplished by a small hand-wheel W which is rigidly connected to the cylinder and disc through the rod U. The direction of the received sound is indicated by means of a pointer P moving on an angular calibrated scale K. Contact tension between the brushes $e$ and blocks $d$, can be adjusted by means of the nut N. Electric connections between the brushes $e$ and slip-rings R, are made by wires Z, which are carried along the cylinder through slots in the insulating cylinder beneath the slip-rings.

The sound impulses are brought to the ear through stethoscope leads S, which connect with extensions of the collector tube T, Figures 5 and 6. Either of two methods may be used in connecting these tubes to the ear, depending whether the maximum or the binaural principle is used by the listener for determining the direction of the sound source.

If the stethoscope leads are connected to the collector tubes T, through the Y connection indicated in Fig. 6, then the sounds from all of the fourteen receivers $1^f$, $2^f$, etc., reach both of the ears. If the sound is proceeding from the direction N indicated in Fig. 1, it will reach the ears of the listener in phase. As a result the impulse from all fourteen receivers will add, and the intensity of the received signal will be relatively clear and loud. If the compensator switch is rotated either side of this position the impulses from the fourteen receivers will reach the ears more and more out of phase and as a result the impulse from these receivers will not add perfectly, but will become weakened and indistinct. The direction of the sound source will be determined by that position of the compensator which gives a maximum of intensity of the received sound.

If the collecting tube T for the right group of receivers, $1^f$ to $7^f$ inclusive, is connected by a stethoscope lead to the right ear and the left hand group of receivers, $8^f$ and $14^f$ inclusive, are similarly connected to the left ear as shown in Fig. 5, then the impulses from a sound coming in the direction indicated by the arrow N will reach both ears in phase, but only the impulses from seven receivers will reach each ear. The sound will appear to the listener to be located in the plane normal to the line joining the two ears. The intensity of the sound will be relatively strong and clear in character, because of the fact that impulses from the several receivers connected to each ear are in phase. If now, the compensator switch is turned in either direction from this position, the intensity of the sound becomes weaker and less distinct in character. Moreover the sound will appear to the listener to move away from the median plane, to one side or the other depending upon which direction from the centered position the compensator switch has been turned. The sense of direction as determined by the two ears depends largely on the time which elapses between the corresponding sound impulses in the two ears. If the right ear receives the sound before the left ear does, then the sound appears to come from the right. The variation to the right depends upon the magnitude of the interval. Similarly, if the sound reaches the left ear first, the listener judges the sound to be on his left. This sense of direction is termed the binaural, and a device employing this sense is said to depend upon the binaural principle for operation.

If the sound comes from the direction indicated by the arrow NE, it is evident that the group of receivers connected to the right ear receive the sound impulses before those connecting with the left ear; and as a result, the sound impulses reach the right ear somewhat before they reach the left ear. The sound therefore, appears to the listener to come from the right and moreover the sound will be weak and of poor quality, because the impulses from each group of receivers reach the respective ears out of phase.

If the compensator switch is rotated clockwise, this sound will appear to rotate anticlockwise and become louder and more clearly defined. The actual direction will be determined by the position the switch occupies when the sound appears to the listener to be binaurally centered and to be at a maximum of intensity. It will be noted that the instrument, so connected to the ear, operates both on the maximum and the binaural principle. In the apparatus as above described the receivers are employed for transforming the electric impulses from the two groups of microphones to sound, and the sounds from the several receivers are brought into phase by air columns of predetermined difference in length.

The process of bringing the sounds from several receivers in phase at the listener's ears by introducing proper time lag in the path from each separate receiver is called compensation. In the foregoing description this has been described as accomplished by passing the sound through tubes of properly determined length. The invention, however, is not limited to compensation by varying lengths of air columns. Compensation may be accomplished in other ways.

As shown in the drawings, the compensator brushes and contact blocks are arranged so that every other microphone of the right hand and left hand sets has a corresponding brush on the movable plate. The invention is not limited to such a construction. This construction, however, has the advantage that it makes possible the accurate determination of direction to within an angle equal to half the angular spacing between the microphones. This is due to the fact that two microphones are connected in parallel to each receiver when the brushes bridge two blocks. Under such conditions the adjacent pairs of microphones connected to each receiver produce sound which has a phase equal to the resultant of that actuating the two corresponding microphones of each pair. This resultant sound is identical in phase with that which would be given by a microphone located on the circle half way between the pair in each case.

It is to be noticed that when the compensator switch is turned, double the number of microphones are in service while the brushes are bridging two blocks that are in service when each brush touches one block and that there are never more than two mircrophones connected to any one receiver.

While it is preferred to arrange the apparatus so that the microphonic receivers are in two sets of groups symmetrical with respect to that diameter of the circle passing through the sound source so that the binaural principle may be used, the apparatus may be operated on the maximum principle only without so grouping the receivers thereby simplifying the construction somewhat. Moreover, the apparatus may be operated on the binaural principle by connecting only a single microphone to each ear-piece.

While the preferred invention has been illustrated and described, it is to be understood that it is not limited to its illustrated embodiment but may be embodied in other structures within the scope of the following claims.

I claim:

1. In apparatus of the character described, the combination of a plurality of receptors of wave energy disposed in a circle, a detecting device having a plurality of branch energy transmitting paths, and means for connecting the branch paths to the circle of receptors in varying angular relation to the circle but with fixed angular relation with respect to each other, the branch paths having predetermined time difference of energy traverse equal to the differences in time of arrival at the receptors to which they are connected, of wave energy passing in a certain direction across the circle of receptors, substantially as described.

2. In apparatus of the character described, the combination of a plurality of receptors of wave energy disposed in a circle and having output terminals disposed in a circle and angularly spaced corresponding to the angular spacing of the receptors, and means for collecting and utilizing the received energy comprising a plurality of branch energy transmitting paths having input terminals disposed in a circle and adapted to connect with the circularly arranged output terminals, said energy transmitting connections having provision for imposing on the transmitted energy time lag equal to the difference in time of arrival at the receptors to which they are connected, of wave energy passing across the circle of receptors in a certain direction to thereby bring the received wave energy into phase, and means for relatively angularly shifting the input and output terminals to bring into phase energy passing across the circle of receptors in any direction, substantially as described.

3. In apparatus of the character described, the combination of a plurality of receptors of sound energy disposed in a circle, an auditory detecting device having two ear pieces, and means for bringing the received sound into phase at the detecting device comprising connections from the ear pieces to the receptors located diametrically opposite on the circle, said connections being angularly shiftable with respect to the circle of receptors, substantially as described.

4. In apparatus of the character described, the combination of a plurality of receptors of sound energy disposed in a circle, an auditory detecting device, and means for collecting and bringing into phase at the detecting device the received sound energy comprising two sets of branching energy transmitting paths adapted to be connected to two sets of a plurality of receivers each on opposite sides of the circle and having time differences of energy travel thereover equal to the differences in time of arrival at the receptors of a sound wave passing across the circle of receptors in a certain direction, substantially as described.

HARVEY C. HAYES.